(12) United States Patent
Fisher et al.

(10) Patent No.: US 10,632,589 B2
(45) Date of Patent: Apr. 28, 2020

(54) POWER TOOL

(71) Applicant: BLACK & DECKER INC., New Britain, CT (US)

(72) Inventors: Drake L. Fisher, Baltimore, MD (US); Brent A. Kuehne, Red Lion, PA (US); Christian V. Elder, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 432 days.

(21) Appl. No.: 15/249,818

(22) Filed: Aug. 29, 2016

(65) Prior Publication Data

US 2018/0056473 A1 Mar. 1, 2018

(51) Int. Cl.
| | | |
|---|---|---|
| *B24B 23/02* | (2006.01) | |
| *B24B 47/00* | (2006.01) | |
| *B25F 5/02* | (2006.01) | |
| *B24B 55/10* | (2006.01) | |
| *B24B 47/12* | (2006.01) | |

(52) U.S. Cl.
CPC .............. *B24B 23/02* (2013.01); *B24B 47/00* (2013.01); *B24B 47/12* (2013.01); *B24B 55/102* (2013.01); *B25F 5/02* (2013.01)

(58) Field of Classification Search
CPC ............ B24B 23/02; B24B 47/00; B25F 5/02
USPC ......................................................... 451/344
See application file for complete search history.

(56) References Cited

U.S. PATENT DOCUMENTS

| | | |
|---|---|---|
| 4,005,502 A | 2/1977 | Stevens (Boyer) et al. |
| 4,555,849 A | 12/1985 | Ando et al. |
| 4,625,462 A | 12/1986 | Fushiya et al. |
| 4,847,513 A | 7/1989 | Katz et al. |
| 5,018,314 A | 5/1991 | Fushiya et al. |
| D347,778 S | 6/1994 | Clowers et al. |
| 5,317,838 A | 6/1994 | Bourner |
| 5,384,984 A | 1/1995 | Smith et al. |
| 5,392,568 A | 2/1995 | Howard et al. |
| 5,551,114 A | 9/1996 | Lee |
| 5,595,531 A | 1/1997 | Niemela et al. |
| 5,697,115 A | 12/1997 | Sciarra et al. |
| 5,706,541 A | 1/1998 | Gutelius et al. |
| 5,718,014 A | 2/1998 | deBlois et al. |

(Continued)

FOREIGN PATENT DOCUMENTS

| | | |
|---|---|---|
| DE | 19510291 C2 | 9/1998 |
| DE | 202013100852 U1 | 7/2013 |

(Continued)

OTHER PUBLICATIONS

EP Search Report dated Mar. 23, 2018, for EP Application No. 17187441.5.

(Continued)

*Primary Examiner* — George B Nguyen
(74) *Attorney, Agent, or Firm* — Stephen R. Valancius

(57) ABSTRACT

A power tool includes a housing. A motor is housed in the housing. A platen is driven by the motor. The housing includes a first housing part, a second housing part and a third housing part. The housing defines a battery receptacle portion configured to receive a removable battery pack which powers the motor. Each of the first housing part, the second housing part and the third housing part form part of the battery receptacle portion.

19 Claims, 15 Drawing Sheets

(56) References Cited

U.S. PATENT DOCUMENTS

| | | |
|---|---|---|
| 5,807,169 A | 9/1998 | Martin et al. |
| 5,813,903 A | 9/1998 | Amano et al. |
| 5,956,792 A | 9/1999 | Gutelius et al. |
| 5,978,999 A | 11/1999 | deBlois et al. |
| 6,110,028 A | 8/2000 | Chung |
| 6,132,300 A | 10/2000 | Martin et al. |
| 6,213,851 B1 | 4/2001 | Garcia et al. |
| 6,248,007 B1 | 6/2001 | deBlois et al. |
| 6,253,405 B1 | 7/2001 | Gutelius et al. |
| 6,264,539 B1 | 7/2001 | Chen |
| D447,397 S | 9/2001 | Netzler |
| 6,412,572 B2 | 7/2002 | Habedank et al. |
| 6,503,133 B2 | 1/2003 | Wuensch |
| D471,329 S | 3/2003 | Heun |
| 6,758,731 B2 | 7/2004 | Dutterer et al. |
| 6,780,094 B2 | 8/2004 | Walker |
| 6,875,095 B2 | 4/2005 | Walker |
| 6,890,247 B2 | 5/2005 | Dehde |
| D509,722 S | 9/2005 | Wikle et al. |
| D525,752 S | 7/2006 | Bakker |
| D526,868 S | 8/2006 | Robson |
| D528,387 S | 9/2006 | Robson |
| 7,104,873 B1 | 9/2006 | Borinato et al. |
| D534,323 S | 12/2006 | Hong |
| D538,490 S | 3/2007 | Hong |
| 7,198,559 B2 | 4/2007 | Walstrum et al. |
| 7,201,643 B2 | 4/2007 | Dineen et al. |
| D548,901 S | 8/2007 | Hong |
| 7,270,598 B2 | 9/2007 | Dutterer et al. |
| 7,291,061 B2 | 11/2007 | Kiss |
| 7,291,062 B2 | 11/2007 | Kiss et al. |
| 7,313,838 B2 | 1/2008 | Long et al. |
| 7,476,144 B2 | 1/2009 | Dineen et al. |
| 7,516,508 B2 | 4/2009 | Stackpole, Jr. et al. |
| 7,536,743 B2 | 5/2009 | Goh et al. |
| 7,565,712 B2 * | 7/2009 | Long ............... A47L 11/065 15/22.2 |
| 7,581,323 B2 | 9/2009 | Miklosz et al. |
| 7,731,571 B2 | 6/2010 | Fukinuki et al. |
| 7,771,253 B2 | 8/2010 | Wuensch |
| 7,794,308 B2 | 9/2010 | Wuensch et al. |
| D636,244 S | 4/2011 | Keller |
| 7,941,929 B2 | 5/2011 | Miklosz et al. |
| 8,105,132 B2 | 1/2012 | Roehm et al. |
| 8,172,650 B2 | 5/2012 | Caryk et al. |
| 8,192,254 B2 | 6/2012 | Fukinuki et al. |
| 8,231,437 B2 | 7/2012 | McRoberts et al. |
| 8,435,097 B2 | 5/2013 | McRoberts et al. |
| 8,475,236 B2 | 7/2013 | Zhang et al. |
| D703,508 S | 4/2014 | Kawase et al. |
| 8,869,912 B2 | 10/2014 | Roßkamp et al. |
| D718,998 S | 12/2014 | Tirone et al. |
| 9,061,393 B2 | 6/2015 | Sugita et al. |
| 9,079,290 B2 | 7/2015 | Esenwein |
| 9,114,500 B2 | 8/2015 | Sugita et al. |
| 9,224,995 B2 | 12/2015 | Martinsson et al. |
| 9,287,751 B2 | 3/2016 | Naito et al. |
| 9,289,882 B2 | 3/2016 | Kaneko |
| 2003/0121676 A1 | 7/2003 | Ortt et al. |
| 2006/0003680 A1 | 1/2006 | Robson |
| 2006/0156860 A1* | 7/2006 | Arich ............... B25D 16/00 74/606 R |
| 2007/0044984 A1* | 3/2007 | Fischer ............... B25D 17/043 173/217 |
| 2008/0122403 A1 | 5/2008 | Griffin |
| 2008/0216282 A1* | 9/2008 | Conrad ............... A47L 5/24 15/352 |
| 2011/0147031 A1 | 6/2011 | Matthias et al. |
| 2012/0157257 A1 | 6/2012 | Hirabayashi et al. |
| 2012/0324743 A1 | 12/2012 | Bergquist et al. |
| 2013/0097878 A1 | 4/2013 | Naito et al. |
| 2013/0098647 A1 | 4/2013 | Martinsson et al. |
| 2013/0217312 A1 | 8/2013 | McRoberts et al. |
| 2014/0008090 A1 | 1/2014 | Kokinelis et al. |
| 2014/0083729 A1 | 3/2014 | Naito et al. |
| 2014/0327215 A1 | 11/2014 | Thorson et al. |
| 2014/0357165 A1 | 12/2014 | Elen |
| 2015/0083450 A1 | 3/2015 | Sperl et al. |
| 2015/0104250 A1 | 4/2015 | Tada et al. |
| 2015/0209949 A1 | 7/2015 | Milbourne et al. |
| 2015/0328763 A1 | 11/2015 | Ito et al. |
| 2015/0328764 A1 | 11/2015 | Yoshikane et al. |
| 2015/0328796 A1 | 11/2015 | Okouchi et al. |
| 2015/0375315 A1 | 12/2015 | Ukai et al. |
| 2015/0375416 A1 | 12/2015 | Haneda et al. |
| 2016/0176064 A1 | 6/2016 | Okouchi et al. |
| 2016/0199962 A1* | 7/2016 | Tan ............... B25F 5/02 451/344 |

FOREIGN PATENT DOCUMENTS

| | | |
|---|---|---|
| DE | 102013225885 A1 | 6/2015 |
| EP | 2607016 A2 | 6/2013 |
| EP | 2946878 A1 | 11/2015 |
| FR | 2992245 A1 | 12/2013 |
| GB | 1340656 A | 12/1973 |
| GB | 2423492 A | 8/2006 |
| JP | 2009166147 A | 7/2009 |
| JP | 2011097837 A | 5/2011 |
| JP | 2013-18868 A | 1/2013 |
| JP | 2013129017 A | 7/2013 |
| JP | 2013188804 A | 9/2013 |
| JP | 2014-148020 A | 8/2014 |
| WO | 2012/019816 A1 | 2/2012 |

OTHER PUBLICATIONS

Pictures of DeWalt Oscillating Tool—DCS 355, believed to be publicly available prior to Aug. 29, 2016.

Pictures of Makita Sander—XB01Z, believed to be publicly available prior to Aug. 29, 2016.

* cited by examiner

POWER TOOL

FIELD OF THE INVENTION

The present invention relates to power tools.

BACKGROUND

There are various existing power tools. It is desired to provide a power tool with an efficient housing construction.

SUMMARY

According to an aspect of an exemplary embodiment, there is a power tool comprising which includes a housing. A motor is housed in the housing. A platen is driven by the motor. The housing includes a first housing part, a second housing part and a third housing part. The housing defines a battery receptacle portion configured to receive a removable battery pack which powers the motor. Each of the first housing part, the second housing part and the third housing part form part of the battery receptacle portion.

The battery receptacle portion may include a first rail and a second rail, the first and second rails are configured to engage rails of the removable battery pack.

The first, second and third housing parts may each form part of at least one of the first rail and the second rail.

The first housing part and the second housing part may together form the first rail.

The third housing part may form the second rail.

The first housing part may be a first side housing part. The second housing part may be a second side housing part. The third housing part may be a top housing part.

The first side housing part and the second side housing parts may form sides of the housing when the platen is disposed on a flat horizontal surface and the top housing part forms a top part of the housing when the platen is disposed on a flat horizontal surface.

The power tool may be a sander.

The first rail may be generally perpendicular to a rotational axis of the motor.

An electrical connector may be configured to electrically engage with the battery pack is held between the second housing part and the third housing part.

According to another aspect, there is an exemplary embodiment of a sander, the sander including a housing, a motor housed in the housing, and a sanding platen which is driven by the motor. The housing includes a first housing part, a second housing part and a third housing part. The housing defines a battery receptacle portion configured to receive a removable battery pack which powers the motor, the battery receptacle portion including a first rail and a second rail, the first rail and the second rail configured to engage rails of the removable battery pack. The first rail is comprised of the first housing part and the second housing part.

The third rail may be comprised of the third housing part.

The sander may further include an electrical connector held between the second housing part and the third housing part.

The first housing part may be a first side housing part. The second housing part may be a second side housing part. The third housing part may be a top housing part.

The first side housing part and the second side housing parts may form sides of the housing when the platen is disposed on a flat horizontal surface and the top housing part forms a top part of the housing when the platen is disposed on a flat horizontal surface.

The first rail and the second rail may be generally perpendicular to a rotational axis of the motor.

The first housing part, the second housing part and the third housing part may be made of a plastic material.

According to another aspect, there is an exemplary embodiment of a power tool including a housing, a motor housed in the housing, and a platen which is driven by the motor. The housing includes a first housing part, a second housing part and a third housing part. The housing defines a battery receptacle portion configured to receive a removable battery pack which powers the motor, the battery receptacle portion comprising a first rail and a second rail, the first rail and the second rail configured to engage rails of the removable battery pack. The third housing part is a top housing part that forms a top part of the housing when the platen is disposed on a flat horizontal surface. The second rail is comprised of the third housing part.

The first rail may be comprised of the first housing part and the second housing part.

The sander may further include an electrical connector held between the second housing part and the third housing part.

The first housing part may be a first side housing part. The second housing part may be a second side housing part. The first side housing part and the second side housing parts may form sides of the housing when the platen is disposed on a flat horizontal surface.

The power tool may be a sander.

According to another aspect, an exemplary embodiment includes method of constructing a power tool. The method includes providing a first housing part, a second housing part and a third housing part. Moving the first housing part and the second housing part relatively toward each other to capture a motor therebetween and assembling the first housing part and the second housing part together. Moving the third housing part relatively towards the assembled first and second housing parts to capture a connector component therebetween.

The first housing part, the second housing part and the third housing part may be comprised of plastic.

The connector component may be an electrical connector component.

The electrical connector component may be configured to engage with a battery pack to power the power tool.

The first housing part may include a first side part which forms a first side of the power tool when the power tool is placed on a flat horizontal surface.

The second housing part may include a second side part which form a second side of the power tool when the power tool is placed on the flat horizontal surface.

The third housing part may include a top part which forms a top of the power tool when the power tool is placed on the flat horizontal surface.

The first housing part and the second housing part may each form part of a first rail configured to engage a first rail of the battery pack.

The third housing part may form a second rail configured to engage a second rail of the battery pack.

DETAILED DESCRIPTION OF EXEMPLARY EMBODIMENTS

Figure 1:
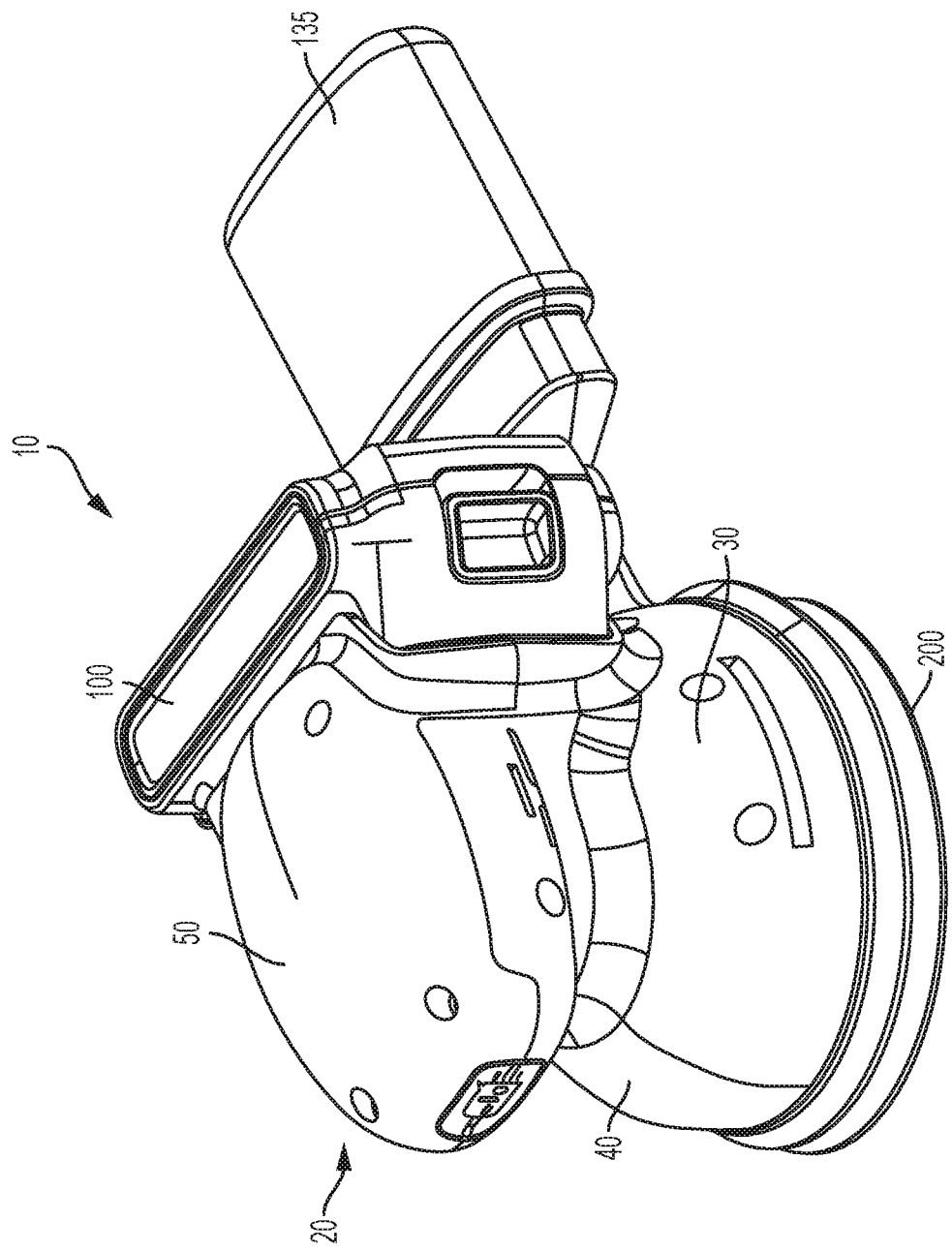
FIG. 1 is a perspective view of an exemplary embodiment of a sander.
Figure 2:
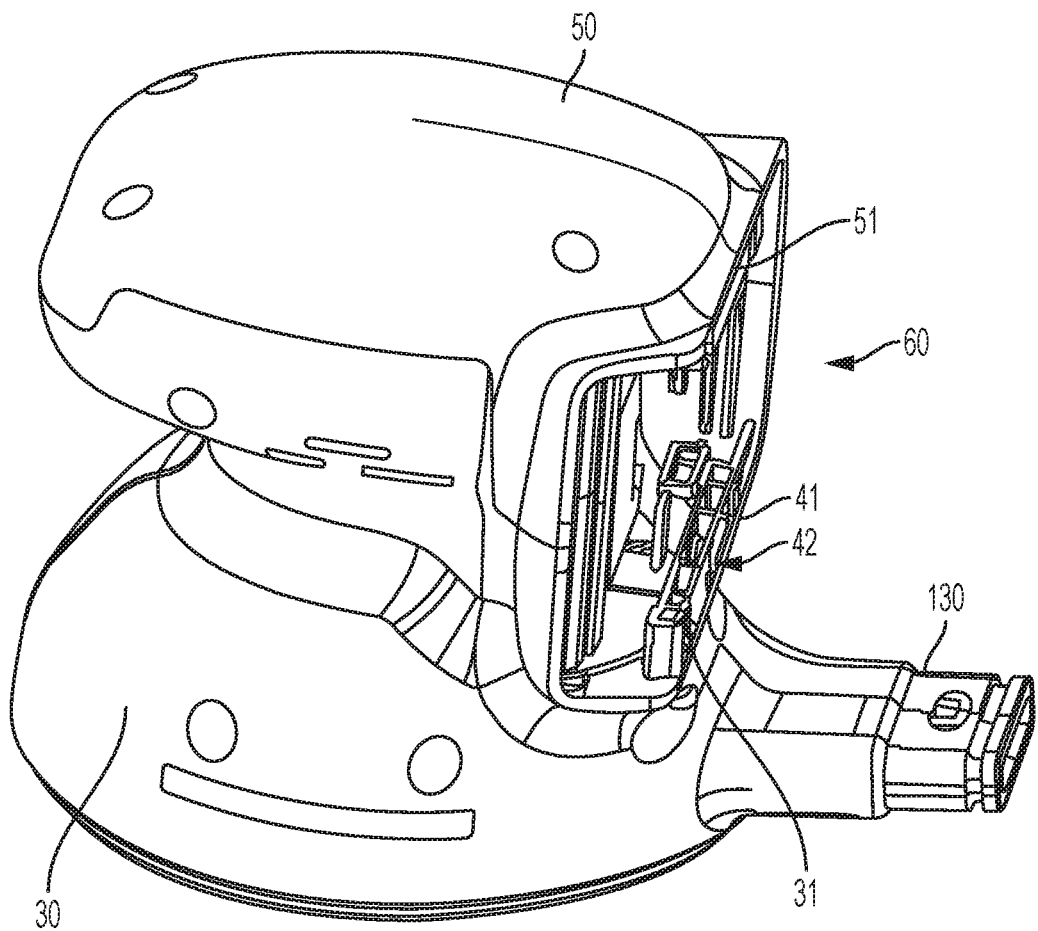
FIG. 2 is another perspective view of the exemplary embodiment of the sander.
Figure 3:
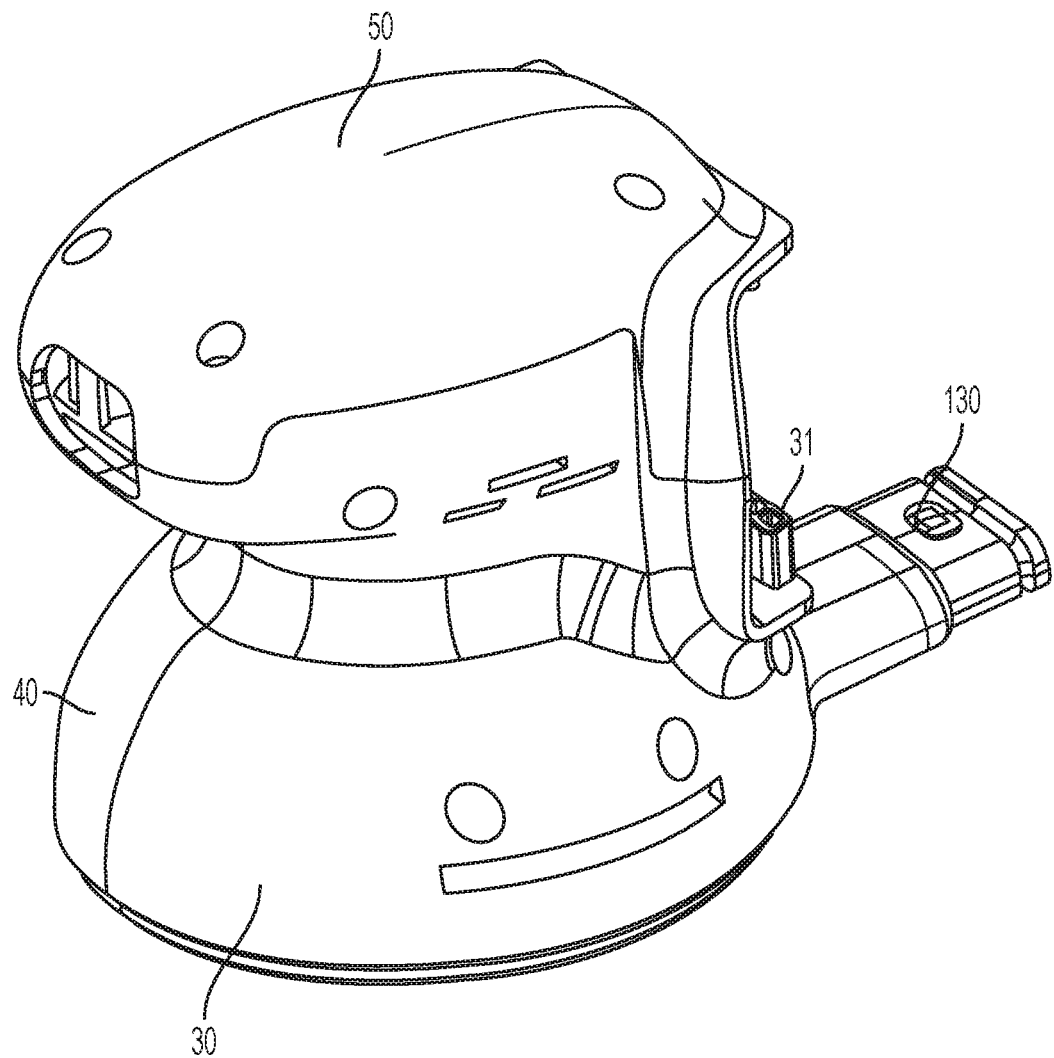
FIG. 3 is a perspective view of the housing of the exemplary embodiment of the sander.
Figure 4:
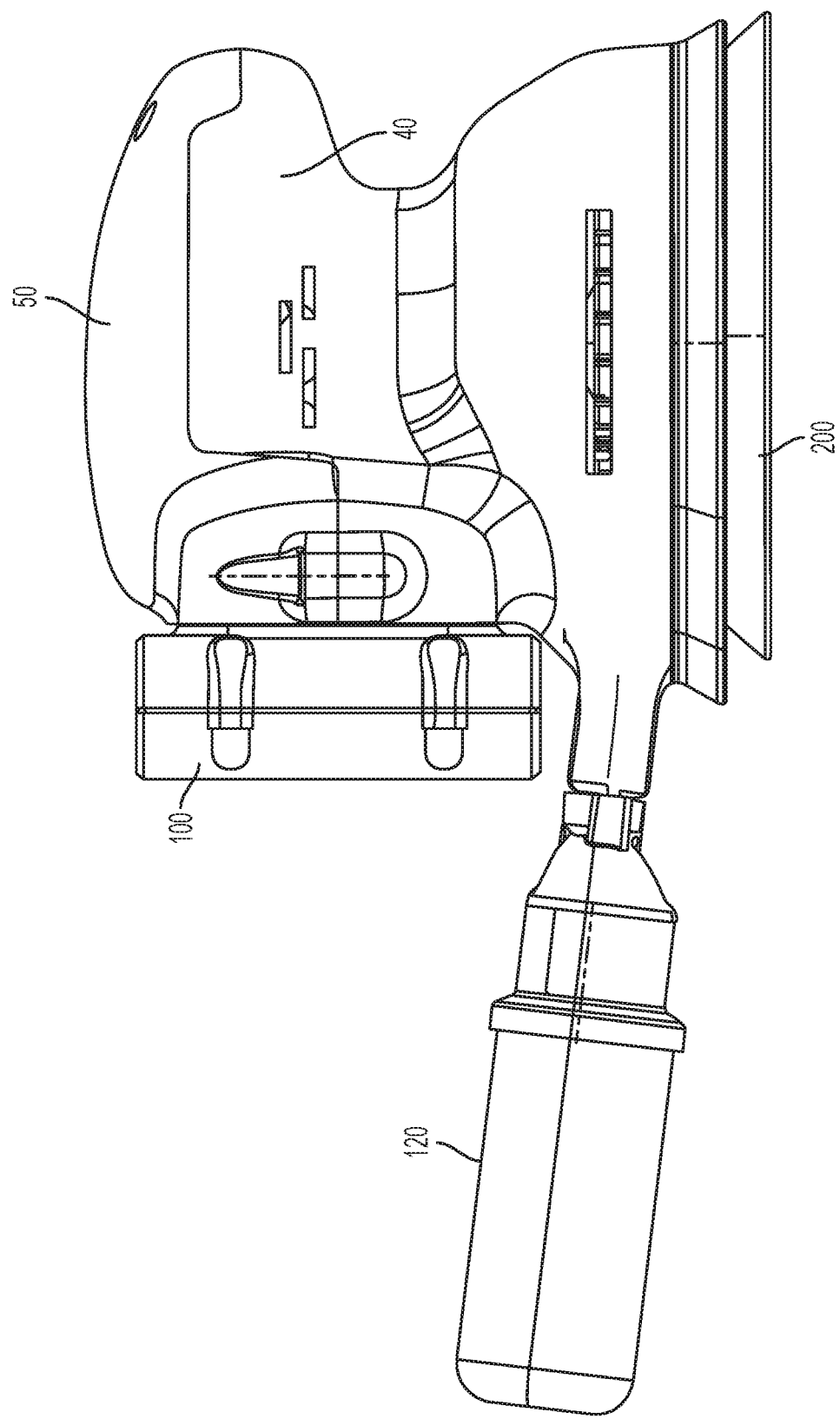
FIG. 4 is a side view of the exemplary embodiment of the sander.

An exemplary embodiment according to the present application is shown in FIGS. 1-15. The exemplary embodiment illustrates a power tool, in particular, a cordless random orbit sander (ROS) 10. The sander 10 of the exemplary embodiment is a random orbit sander. The sander 10 is powered by a removable and rechargeable battery pack 100. The sander 10 is turned on and off by a switch 11. As is well known, the sander 10 rotates a platen 200 in a random orbit to remove materials. The sander 10 of the present exemplary embodiment is a random orbit sander, but in other exemplary embodiments the sander could be a different type of sander, such as an orbit sander, a detail sander or a quarter-sheet sander. As shown, the sander 10 further includes a dust chute 130 which directs dust into a dust bag 135 for collection.

The housing 20 of the sander 10 is comprised of three housing parts including a first housing part/first side part 30, a second housing part/second side part 40 and a third housing part/top housing part 50. The three housing parts are each made of plastic and are assembled together by screws. The three housing parts 30, 40 and 50 can be seen throughout the drawings and are shown in exploded views in FIGS. 10 and 11. The housing parts 30, 40, 50 come together to form a battery receptacle portion 60. As will be appreciated, the battery receptacle portion 60 receives a removable battery pack 100 which powers the sander 10.

Figure 8:
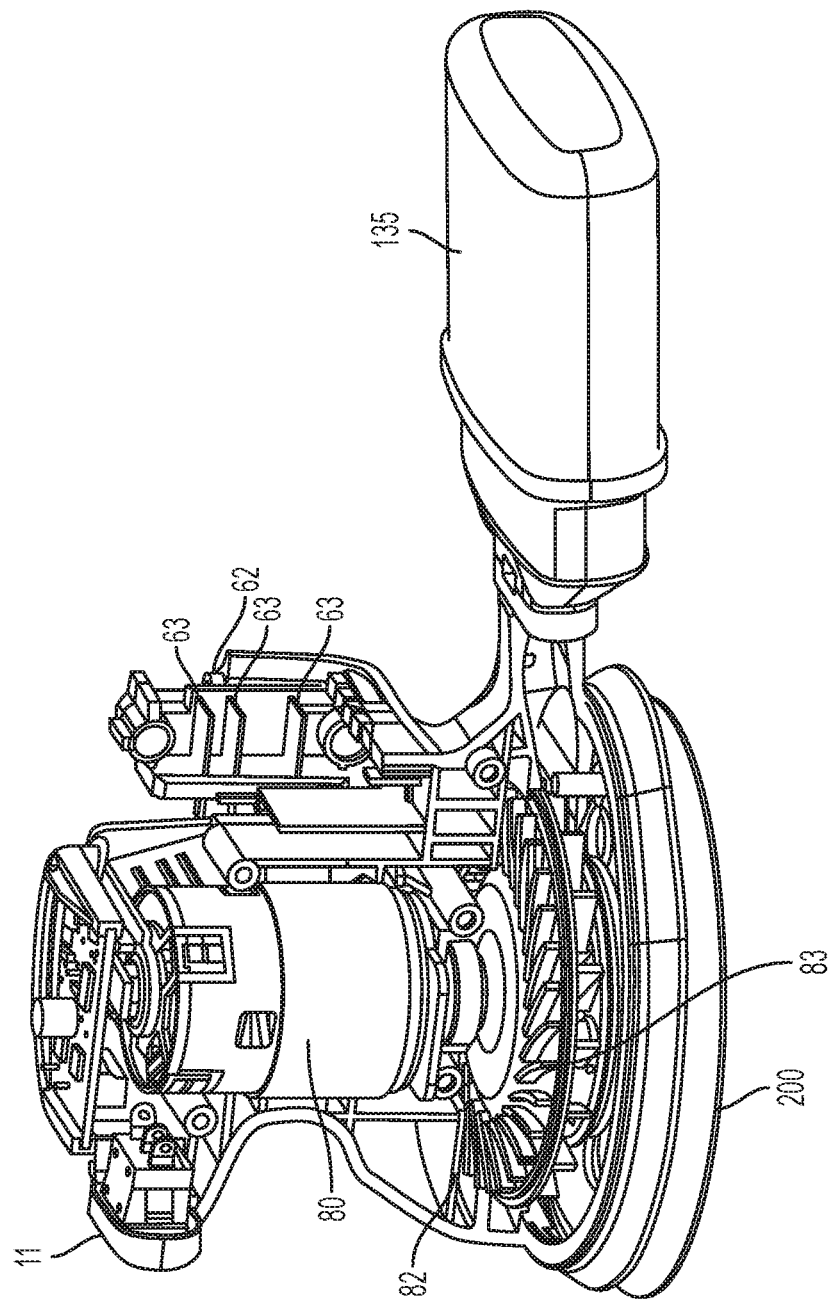
FIG. 8 is a perspective view of the exemplary embodiment of the sander with first and third housing parts removed illustrating internal parts of the sander.
Figure 9:
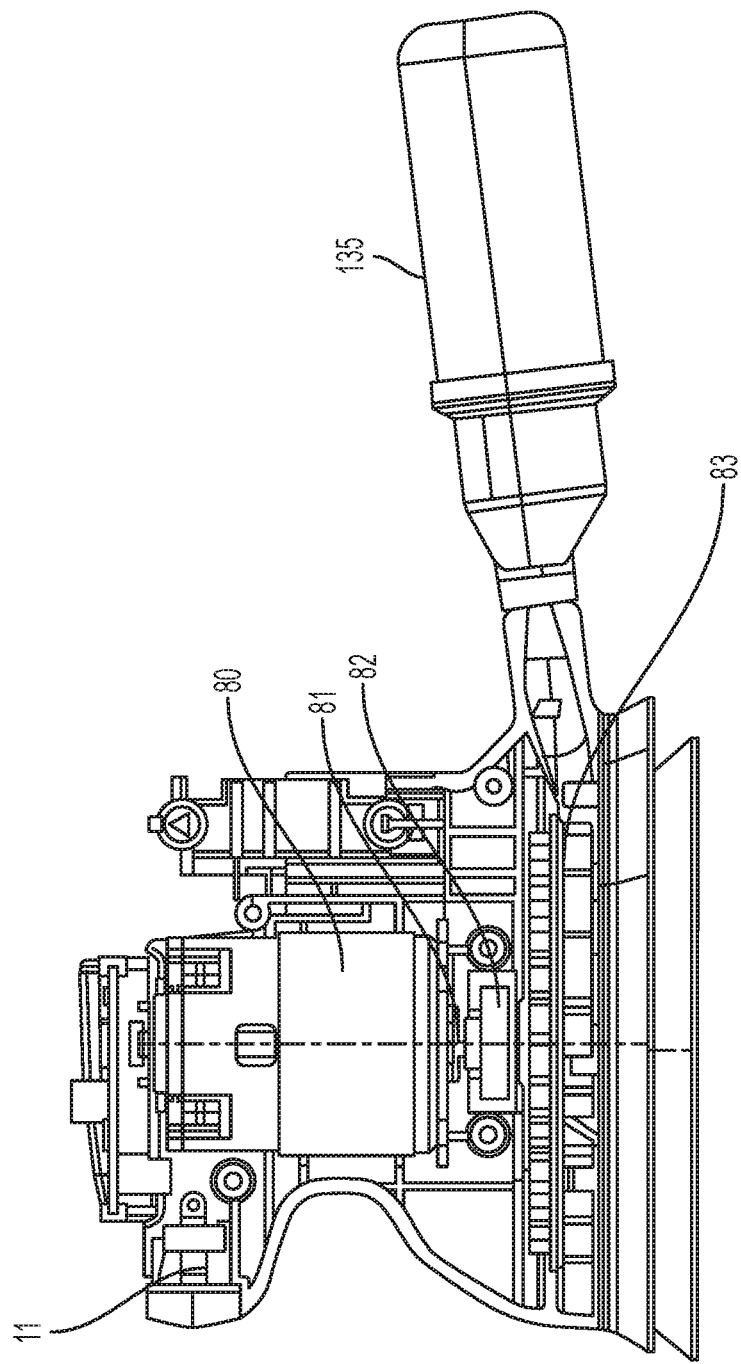
FIG. 9 is a side view of the exemplary embodiment of the sander with first and third housing parts removed illustrating internal parts of the sander.
Figure 10:
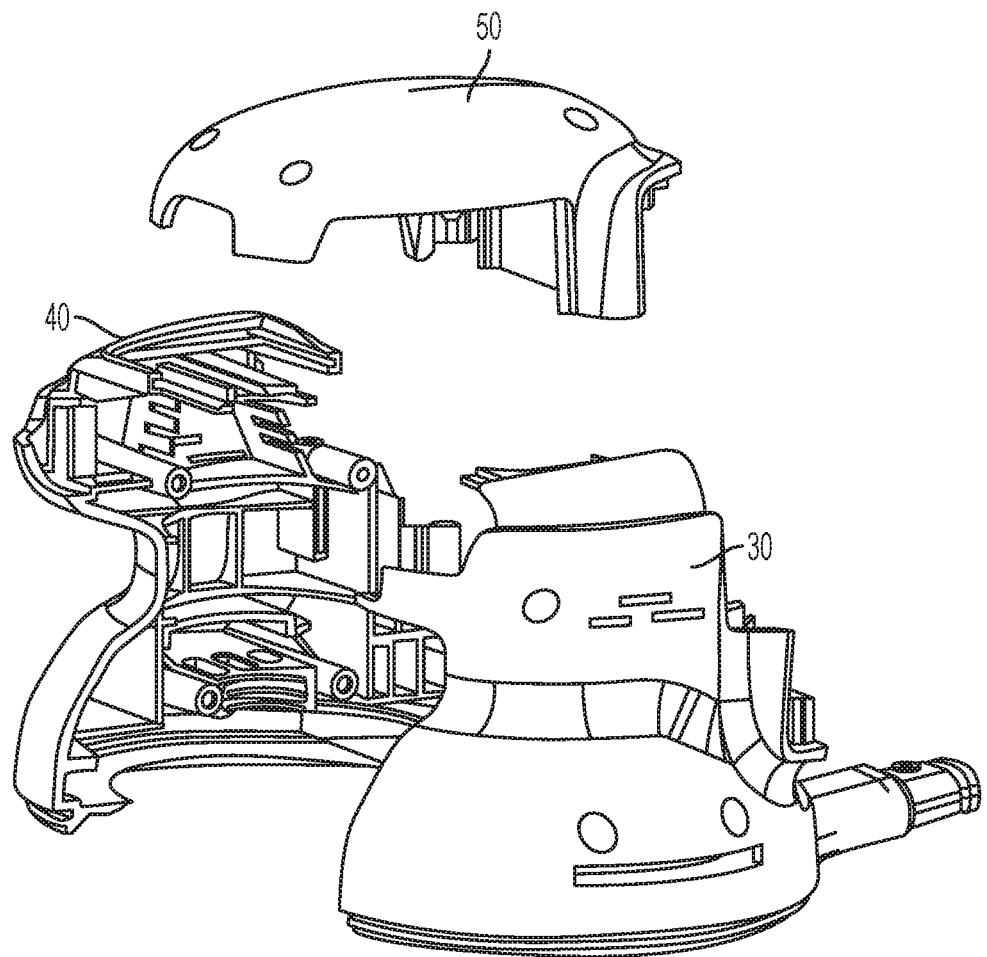
FIG. 10 is an exploded perspective view of the housing of the exemplary embodiment of the sander.
Figure 11:
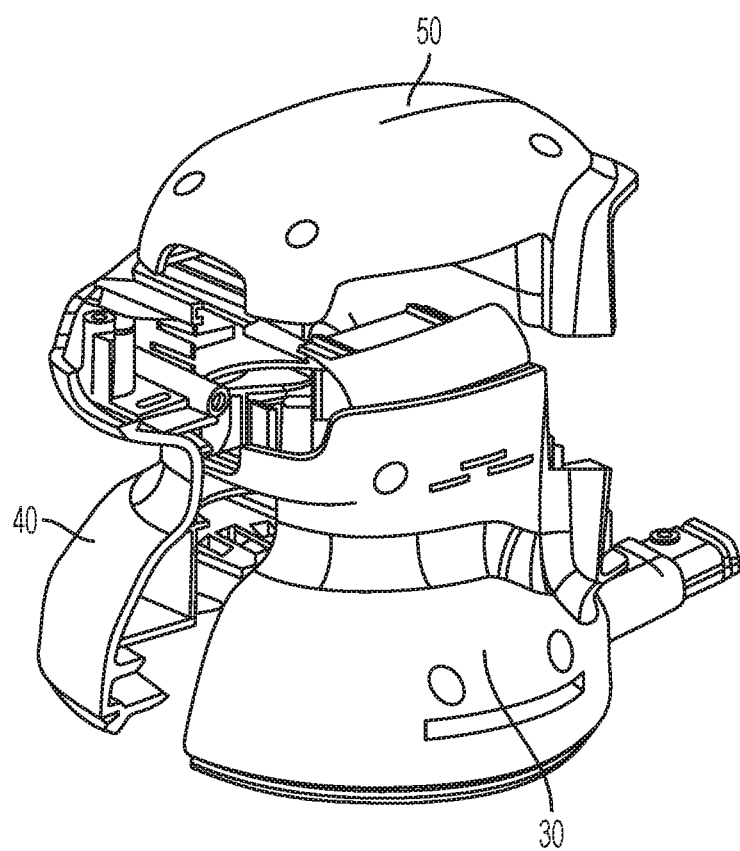
FIG. 11 is another exploded perspective view of the housing of the exemplary embodiment of the sander.

Internals of the sander are shown in FIGS. 8 and 9, in which the first side part 30 and the top housing part 50 have been removed. As shown in FIGS. 8 and 9, a motor 80 rotates an output shaft 81 which rotates a fan 83 and the sanding platen 200. A bearing 82 supports the output shaft 81. The platen 200 receives the output shaft 81 in an eccentric manner so that the platen 200 moves in an orbital motion when driven by the motor 80.

Figure 5:
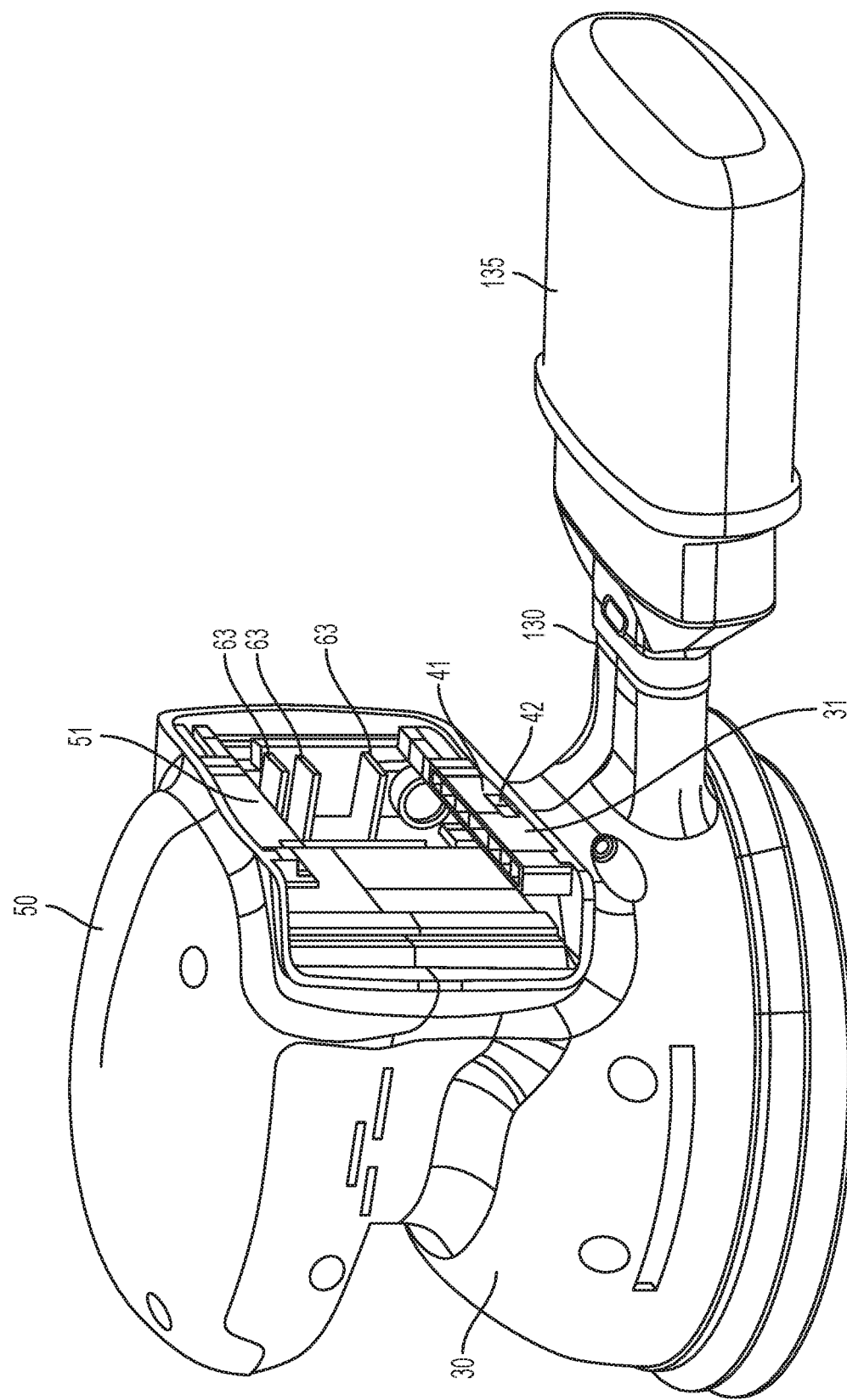
FIG. 5 is another perspective view of the exemplary embodiment of the sander with the battery pack removed.
Figure 6:
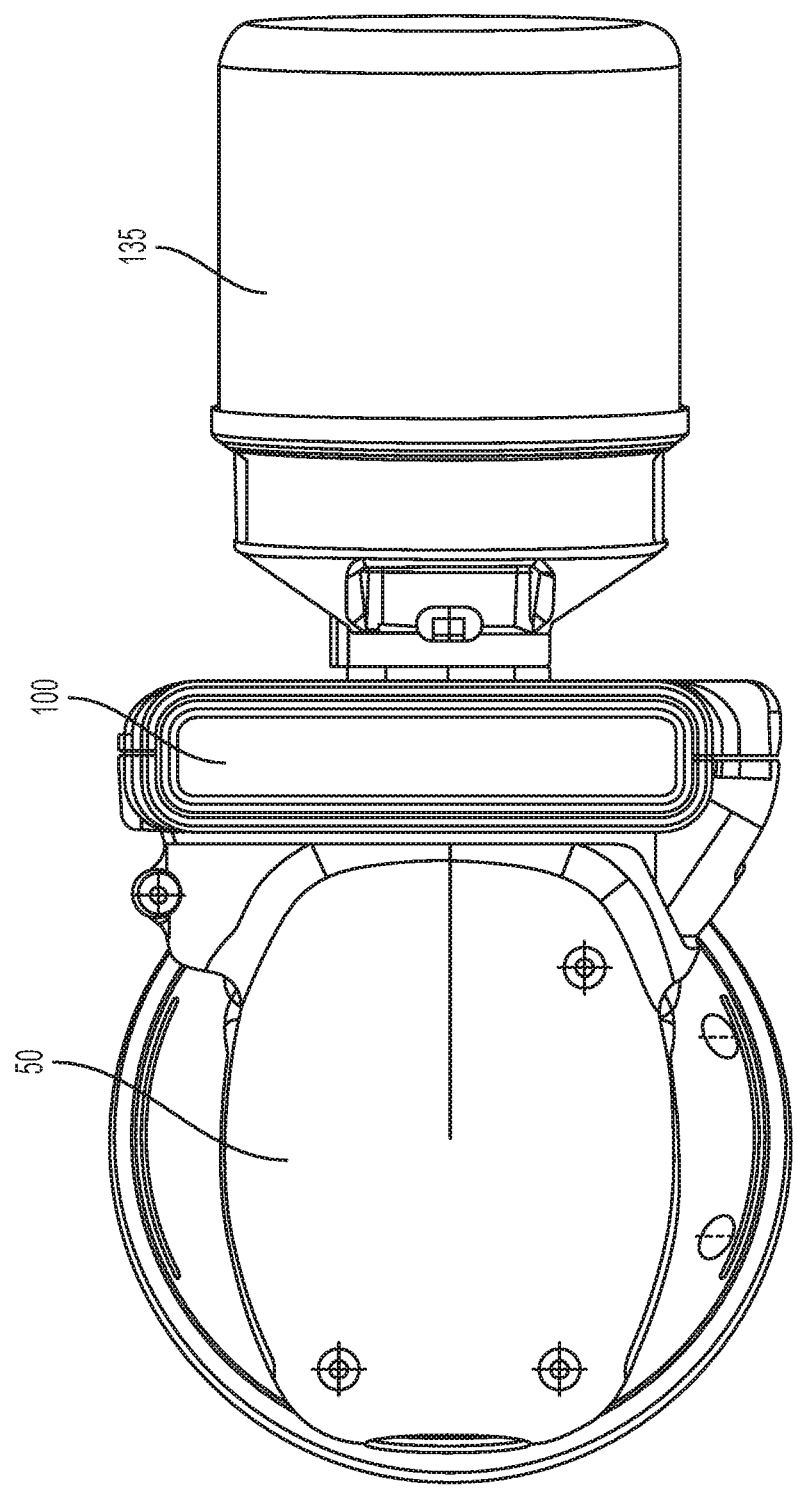
FIG. 6 is a top view of the exemplary embodiment of the sander.

As shown in FIG. 5, the battery receptacle portion 60 includes a first rail 42 and a second rail 51. It also includes an electrical connection section 62 which includes a number of electrical connectors 63. The electrical connectors 63 engage electrical connectors from the battery pack 100 so that the pack 100 can provide power to the motor 80. The first rail 42 is made up of a rail section 31 from the first housing part 30 and a rail section 41 from the second housing part 40. The second rail 51 is formed from the top housing part 50. As seen, the rails 42 and 51 are generally perpendicular to a rotational axis of the motor 80. They also run horizontally when the sander 10 is placed on a flat horizontal surface. Additionally, the electrical connector section 62 is sandwiched between the second housing part 40 and the top housing part 50.

Figure 7:
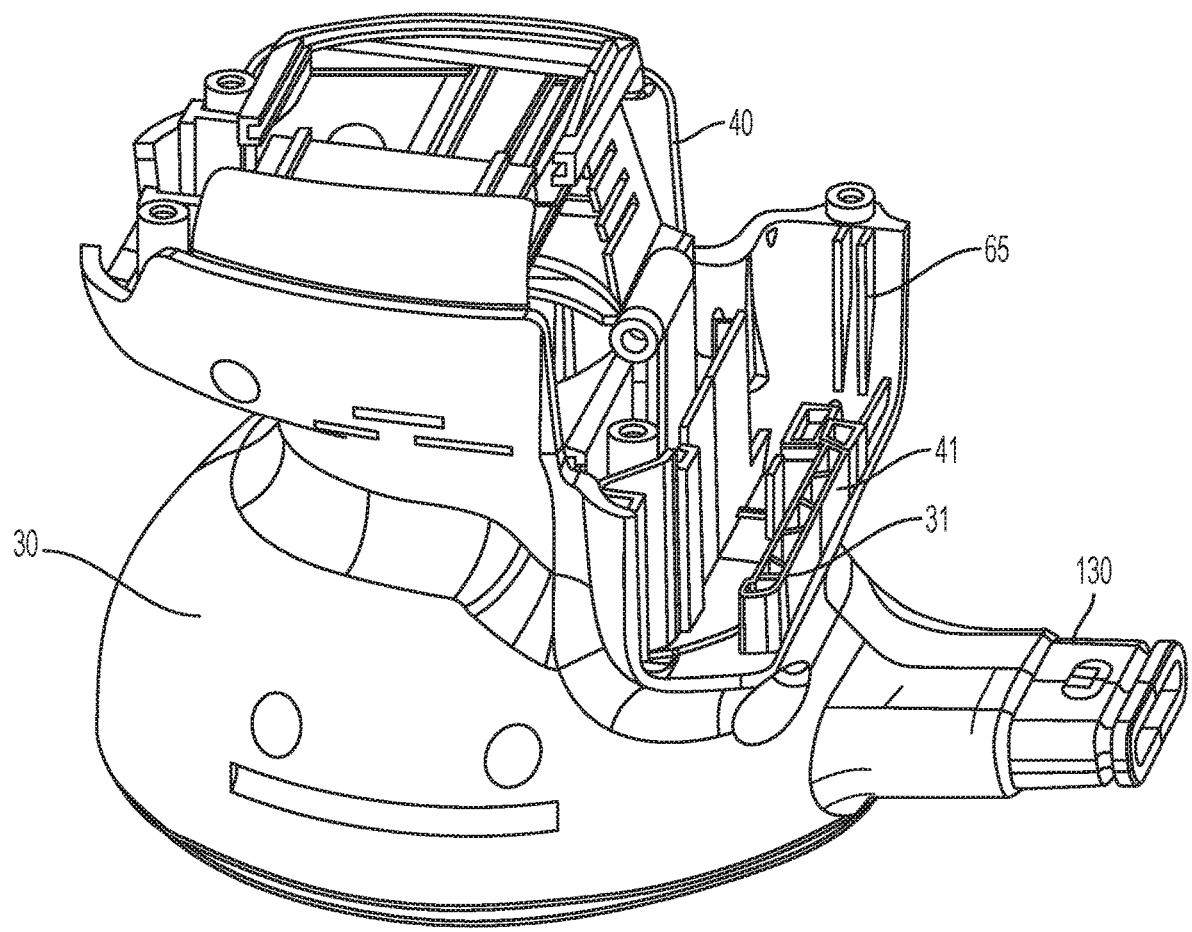
FIG. 7 is a perspective view of the first and second housing parts of the exemplary embodiment of the sander.

The three part construction of the sander housing 20 allows for an efficient design, assembly and for construction of the rails 42 and 51. As can be appreciated, in order to assemble the sander 20, various parts such as the motor 80 can be inserted into the second housing part 40. After that, the first housing part 30 and the second housing part 40 are connected to one another to secure the motor 80 therebetween. Bringing the first housing part 30 and the second housing part 40 together forms the first rail 42 out of the rail section 31 from the first housing part 30 and the rail section 41 from the second housing part 40. The electrical connector section 62 is inserted into the second housing part 40 at the slot 65 shown in FIG. 7. FIG. 7 shows the housing parts 30 and 40 without the electrical connector section 62, which allows the slot 65 to be seen. After the electrical connector section 62 is inserted into the slot 65, the top housing part 50 is then connected to the first and second housing parts 30, 40 to provide the second rail 51 and to secure the electrical connector 62.

Some of the above steps may be done in various orders or configurations. For example, one or more of the motor 80, bearing 82, fan 83 and other parts may be inserted into the first housing part 30 instead of the second housing part 40 so long as they can be clamped between the two housing parts 30, 40. Additionally, the electrical connector section 62 may be inserted before or after the first housing part 30 and the second housing part 40 are connected.

The three-part housing construction of the exemplary embodiment may have several advantages. For example, clamping operations in more than one direction can be performed. That is, the motor 80 can be held between the first and second housing sections 30, 40. Due to its location and the construction of the housing 20, the electrical connection section 62 cannot is not clamped between the first and second housing sections 30, 40. However, the electrical connection section 62 can be held between the second housing section 40 and the top housing section 50. Particularly, the electrical connection section 62 can be inserted into the second housing part 40 from a vertical direction. The top housing section 50 can then be assembled onto the first and second housing parts 30, 40 from the vertical direction to hold the electrical connection section 62 in place.

As will be appreciated, the exemplary embodiment of the present application allows for multiple clamping or holding operations between housing parts to take place. For example, the motor 80 can be held between the first and second housing parts 30, 40 in a first operation in a first direction and the electrical connection section 62 can be held between the top housing part 50 and the second housing part.

Figure 12:
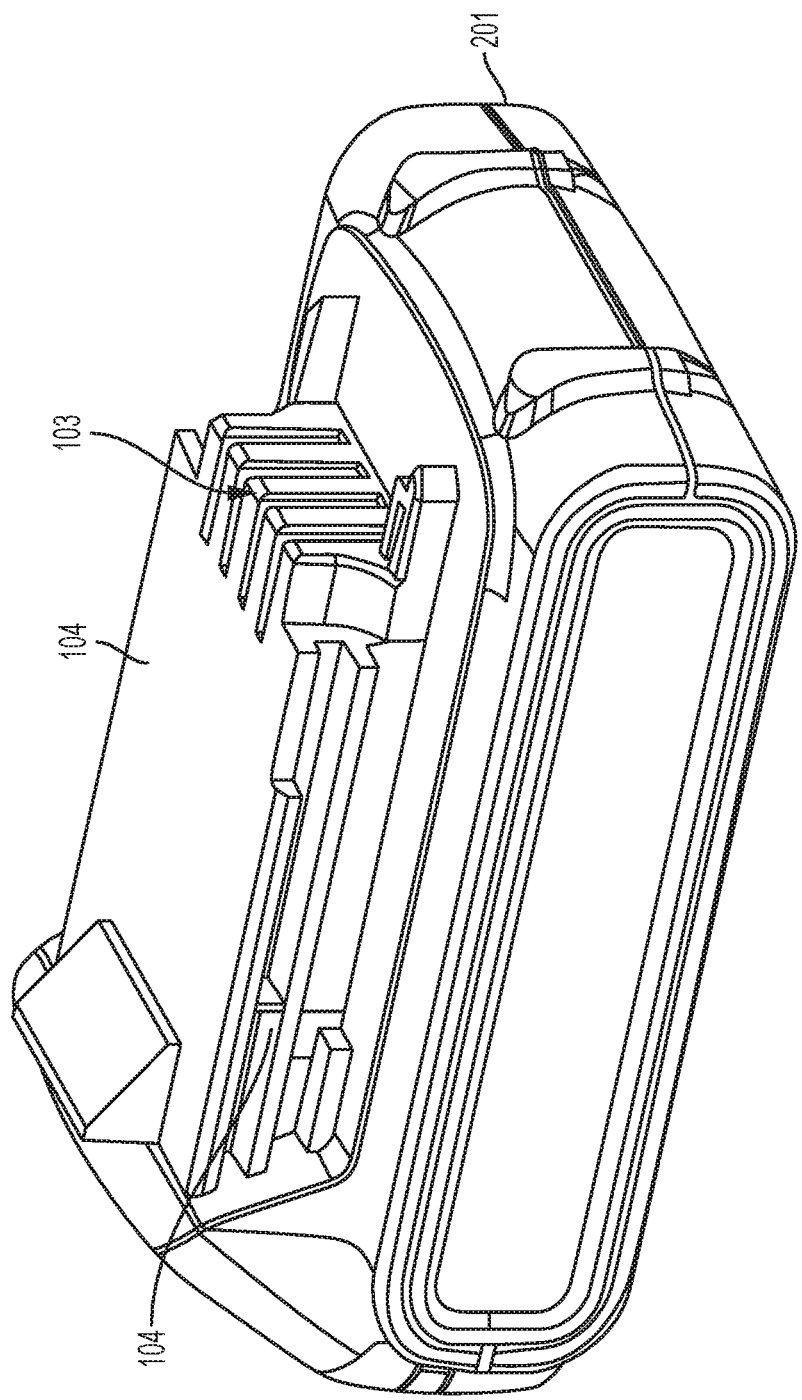
FIG. 12 is a perspective view of an exemplary embodiment of the battery pack.
Figure 13:
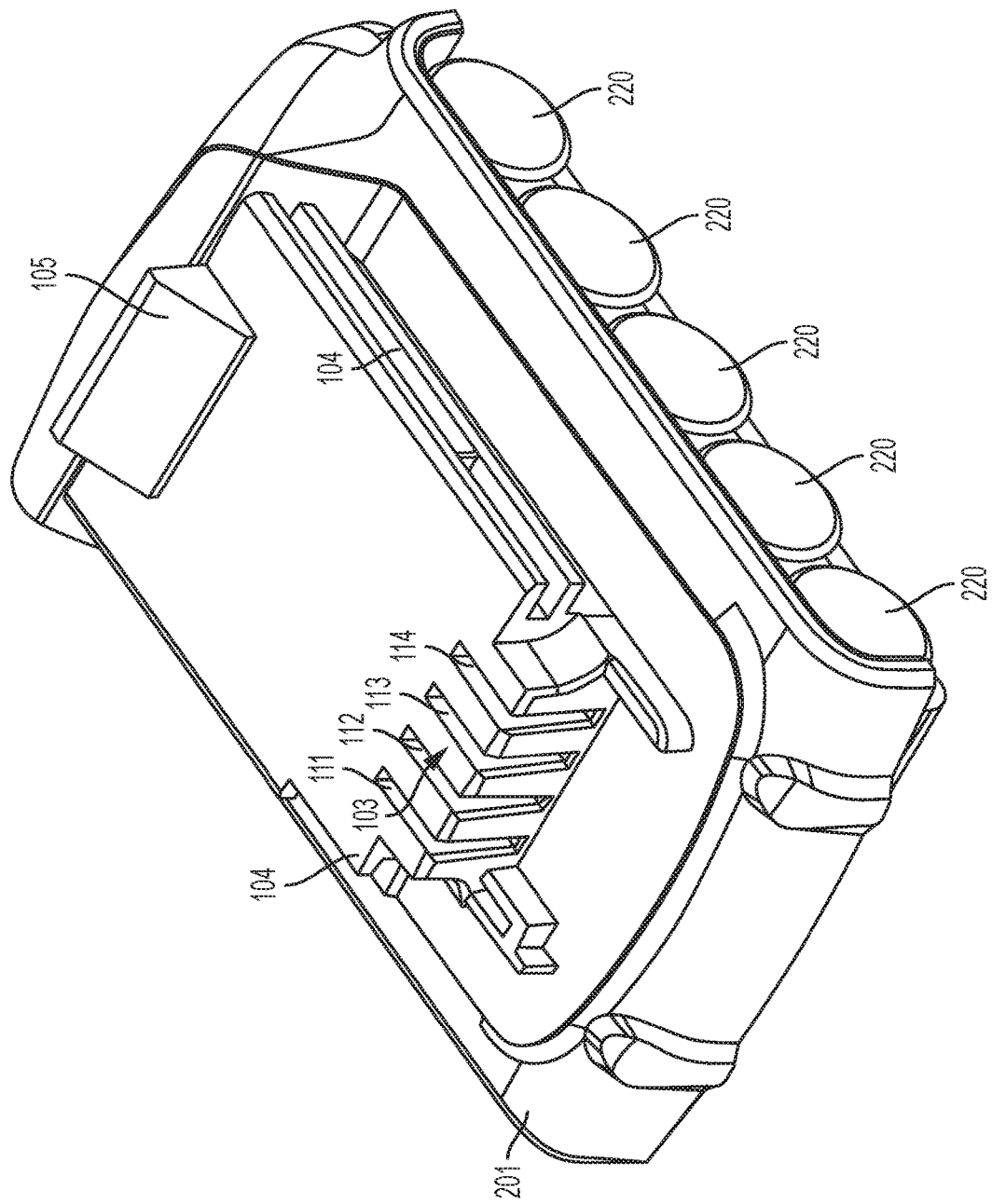
FIG. 13 is a perspective view of the exemplary embodiment of the battery pack with part of the battery pack housing removed to illustrate the battery cells.
Figure 14:
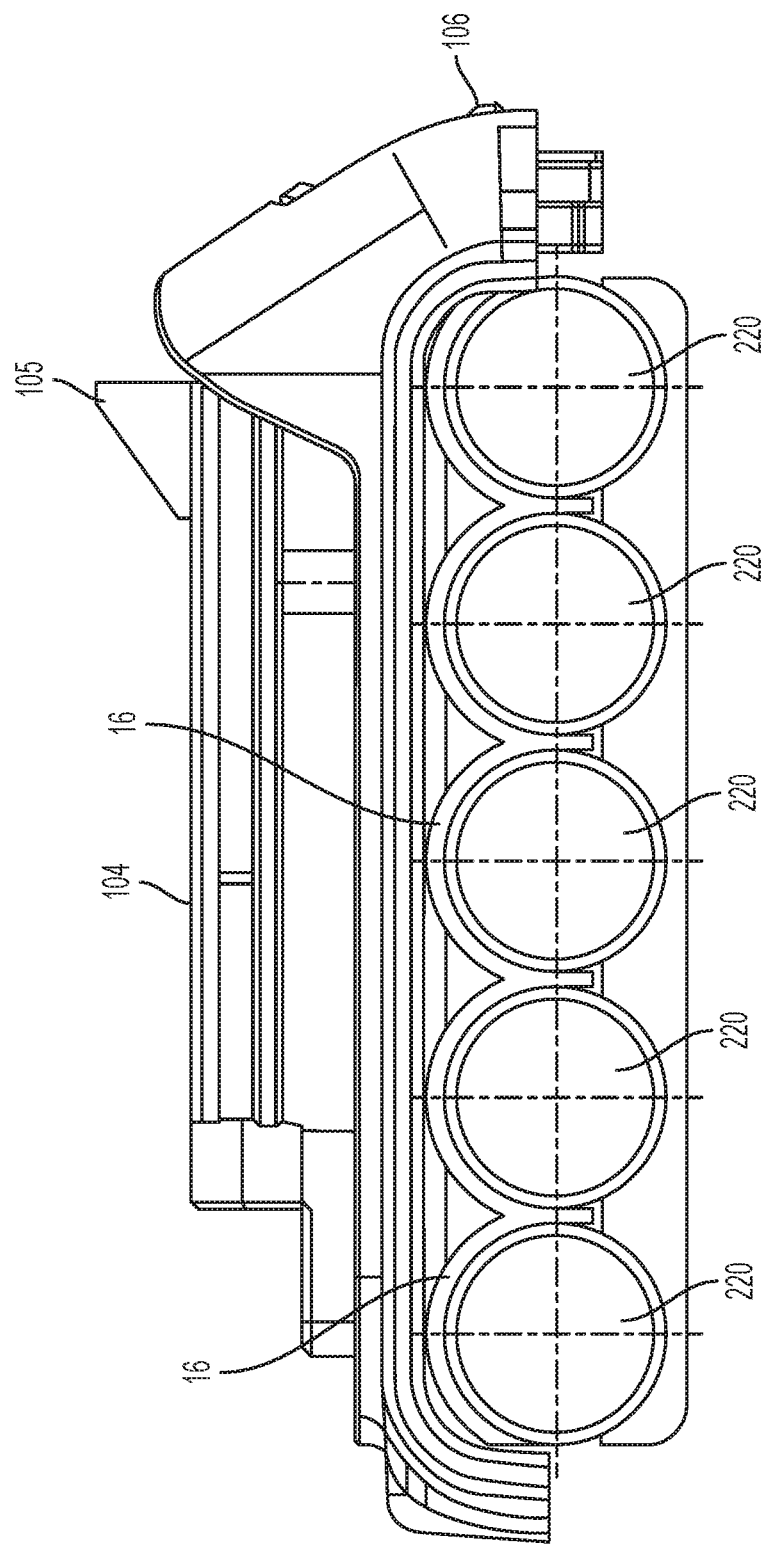
FIG. 14 is a side view of the exemplary embodiment of the battery pack with part of the battery pack housing removed to illustrate the battery cells.
Figure 15:
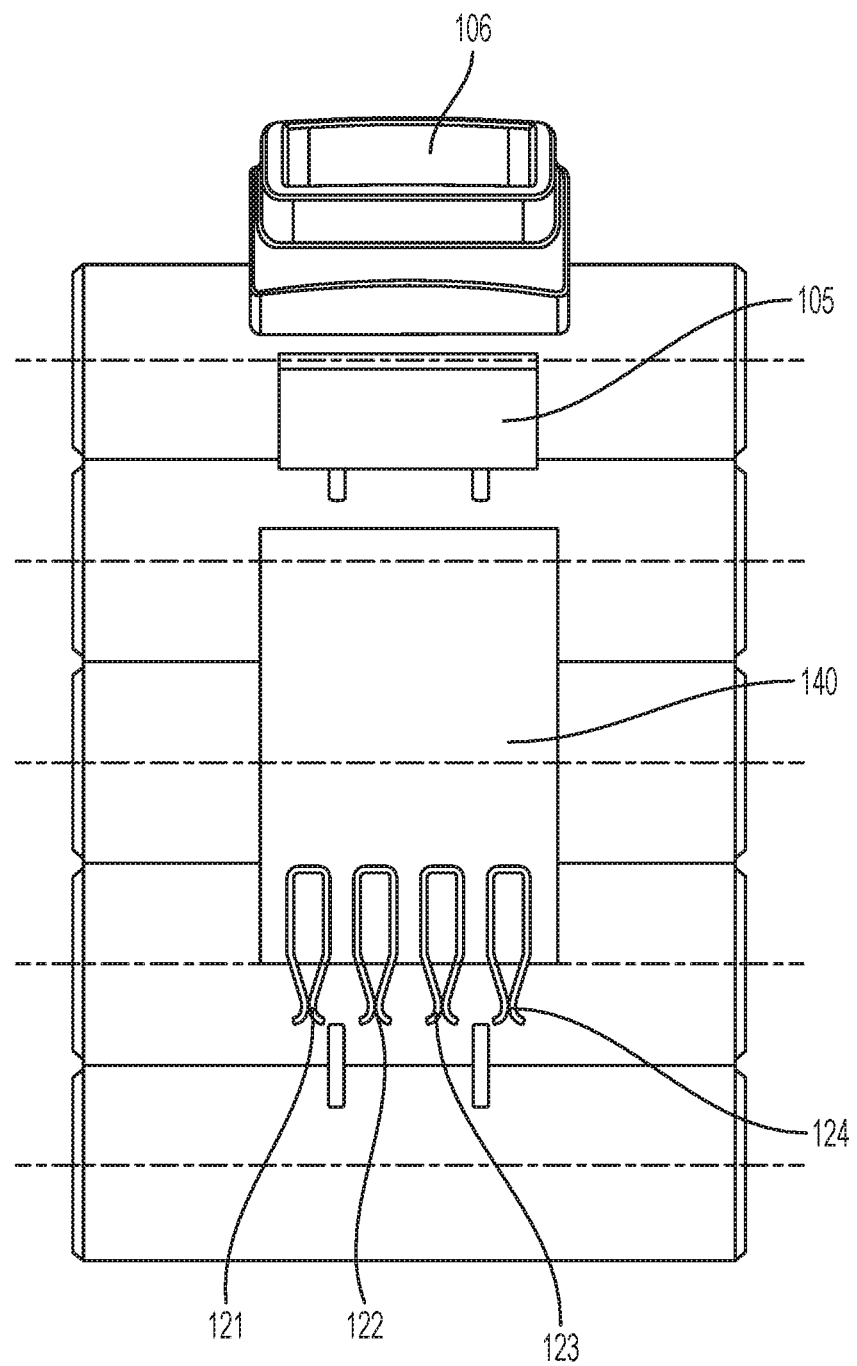
FIG. 15 is a top view of the exemplary embodiment of the battery pack the battery pack housing removed.

The battery pack 100 for powering the sander 10 is shown in further detail in FIGS. 12-15. FIG. 12 is a perspective view of the pack 100. FIG. 13 is a perspective view of the pack 100 with a lower part of the pack housing 201 removed. FIG. 14 is a side view of the pack 100 with a lower part of the pack housing 201 removed. FIG. 15 is a top view of the pack 100 with the pack housing 201 removed.

The power tool battery pack 100 includes a set of rechargeable battery cells 220 disposed in a housing 201. The housing 201 includes guide rails 104 for engaging the rails 42 and 51 of the sander housing 20. The rails 104 slide between the rails 42, 51 and the rest of the sander housing 20 and the rails 42, 51 guide the battery pack 100 into place and prevent it from moving away from the motor 80 area of the housing 20. The battery pack 100 includes a latch 105 for securing the battery pack 100 in place. The latch 105 is biased upwardly by a spring (not shown) and the latch 105 can be moved by depression of the latch actuator 106, which may be integral with the latch 105. A battery pack with guide rails such as those shown these figures is more fully shown and described in U.S. Pat. No. 6,729,413, which is incorporated herein by reference in its entirety. The battery pack 100 also includes a connection section 103 through which the battery pack 100 can make connection with the sander 10. The connection section includes four openings 111, 112, 113 and 114.

FIGS. 13-15 each have at least part of the battery pack housing 201 removed. As shown, the pack 100 includes a plurality of rechargeable battery cells 220. A cradle 16 (FIG. 14) sits over the battery cells 220 and a printed circuit board (PCB) 140 (FIG. 15) is connected to the cradle 16. The PCB 140 is in electrical connection with the battery cells 220. Electric connectors 121, 122, 123 and 124 are mounted on the PCB 140 and connect with power tools through the connection section 103, specifically openings 111, 112, 113 and 114 shown in FIG. 12. The electrical connectors serve as terminals for the battery pack 100. Connector 121 may serve as a negative terminal; connector 122 may be a temperature terminal which relays information related to a temperature of the battery pack; connector 123 may be an ID terminal which relays information related to identifying the pack and connector 124 may be a positive terminal.

The battery pack 100 electrically connects with the sander 10 at the battery pack electrical connector section 62. The electrical connector section 62 includes three electrical connectors 63. The electrical connectors 63 connect with the positive, negative and temperature terminals 121, 124 and 122 of the battery pack 10. The ID terminal 123 of the battery pack 100 is used when charging the battery pack 100. The battery pack 100 may be charged by a separate battery pack charger (not shown).

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A power tool comprising:
   a housing;
   a motor housed in the housing;
   a platen which is driven by the motor;
   wherein the housing comprises a first housing part, a second housing part and a third housing part;
   wherein the housing defines a battery receptacle portion configured to receive a removable battery pack which powers the motor; and
   wherein each of the first housing part, the second housing part and the third housing part form part of the battery receptacle portion; and
   wherein the first housing part, the second housing part and the third housing part are three separate pieces assembled together to form the housing;
   wherein the battery receptacle portion comprises a first rail and a second rail, the first and second rails configured to engage rails of the removable battery pack.

2. The power tool of claim 1, wherein the first, second and third housing parts each form part of at least one of the first rail and the second rail.

3. The power tool of claim 2, wherein the first housing part and the second housing part together form the first rail.

4. The power tool of claim 3, wherein the third housing part forms the second rail.

5. The power tool of claim 1, wherein the first housing part is a first side housing part, wherein the second housing part is a second side housing part and wherein the third housing part is a top housing part; and
   wherein the first side housing part and the second side housing part form sides of the housing when the platen is disposed on a flat horizontal surface and the top housing part forms a top part of the housing when the platen is disposed on a flat horizontal surface.

6. The power tool of claim 1, wherein the power tool is a sander.

7. The power tool of claim 2, wherein the first rail is generally perpendicular to a rotational axis of the motor.

8. The power tool of claim 5, wherein an electrical connector configured to electrically engage with the battery pack is held between the second housing part and the third housing part.

9. A sander comprising:
   a housing;
   a motor housed in the housing;
   a sanding platen which is driven by the motor;
   wherein the housing comprises a first housing part, a second housing part and a third housing part;
   wherein the housing defines a battery receptacle portion configured to receive a removable battery pack which powers the motor, the battery receptacle portion comprising a first rail and a second rail, the first rail and the second rail configured to engage rails of the removable battery pack;
   wherein the first rail is comprised of the first housing part and the second housing part; and
   wherein the first housing part, the second housing part and the third housing part are three separate pieces assembled together to form the housing.

10. The sander of claim 9, wherein the second rail is comprised of the third housing part.

11. The sander of claim 9, further comprising an electrical connector held between the second housing part and the third housing part.

12. The sander of claim 9, wherein the first housing part is a first side housing part, wherein the second housing part is a second side housing part and wherein the third housing part is a top housing part; and
    wherein the first side housing part and the second side housing part form sides of the housing when the platen is disposed on a flat horizontal surface and the top housing part forms a top part of the housing when the platen is disposed on a flat horizontal surface.

13. The sander of claim 9, wherein the first rail and the second rail are generally perpendicular to a rotational axis of the motor.

14. The sander of claim 9, wherein the first housing part, the second housing part and the third housing part are made of a plastic material.

15. A power tool comprising:
a housing;
a motor housed in the housing;
a platen which is driven by the motor;
wherein the housing comprises a first housing part, a second housing part and a third housing part;
wherein the housing defines a battery receptacle portion configured to receive a removable battery pack which powers the motor, the battery receptacle portion comprising a first rail and a second rail, the first rail and the second rail configured to engage rails of the removable battery pack;
wherein the third housing part is a top housing part that forms a top part of the housing when the platen is disposed on a flat horizontal surface; and
wherein the second rail is comprised of the third housing part; and wherein the first housing part, the second housing part and the third housing part are three separate pieces assembled together to form the housing.

16. The power tool of claim 15, wherein the first rail is comprised of the first housing part and the second housing part.

17. The power tool of claim 15, further comprising an electrical connector held between the second housing part and the third housing part.

18. The power tool of claim 15, wherein the first housing part is a first side housing part, wherein the second housing part is a second side housing part; and
wherein the first side housing part and the second side housing part form sides of the housing when the platen is disposed on a flat horizontal surface.

19. The power tool of claim 15, wherein the power tool is a sander.

* * * * *